(12) United States Patent
Nishida

(10) Patent No.: US 9,729,786 B2
(45) Date of Patent: Aug. 8, 2017

(54) IMAGE PROCESSING APPARATUS AND IMAGE CAPTURE APPARATUS USING A PLURALITY OF INTEGRATED CIRCUITS FOR IMAGE PROCESSING

(71) Applicant: CANON KABUSHIKI KAISHA, Tokyo (JP)

(72) Inventor: Tokuro Nishida, Kamakura (JP)

(73) Assignee: CANON KABUSHIKI KAISHA, Tokyo (JP)

(*) Notice: Subject to any disclaimer, the term of this patent is extended or adjusted under 35 U.S.C. 154(b) by 120 days.

(21) Appl. No.: 14/667,788

(22) Filed: Mar. 25, 2015

(65) Prior Publication Data
US 2015/0281574 A1    Oct. 1, 2015

(30) Foreign Application Priority Data

Mar. 31, 2014   (JP) .................... 2014-073735

(51) Int. Cl.
*H04N 5/225*  (2006.01)
*H04N 5/232*  (2006.01)
*H04N 5/228*  (2006.01)

(52) U.S. Cl.
CPC ................. *H04N 5/23229* (2013.01)

(58) Field of Classification Search
CPC ...... H04N 19/44; H04N 19/70; H04N 19/176; H04N 19/593; H04N 19/52; H04N 5/225; H04N 5/23229; H04N 5/23222
See application file for complete search history.

(56) References Cited

U.S. PATENT DOCUMENTS

| | | | | |
|---|---|---|---|---|
| 6,104,417 A | * | 8/2000 | Nielsen | G06F 12/1081 345/502 |
| 2007/0046955 A1 | * | 3/2007 | Silverbrook | B41J 2/14314 358/1.1 |
| 2008/0170257 A1 | * | 7/2008 | Fukuda | G06F 13/1663 358/1.15 |

FOREIGN PATENT DOCUMENTS

JP      11-040739 A     2/1999

* cited by examiner

*Primary Examiner* — Twyler Haskins
*Assistant Examiner* — Carramah J Quiett
(74) *Attorney, Agent, or Firm* — Carter, DeLuca, Farrell & Schmidt, LLP

(57) ABSTRACT

An image processing apparatus and an image capture apparatus can efficiently use a plurality of integrated circuits for image processing. Image processing ICs are integrated circuits that deal with different formats of image data. A programmable logic IC converts a data format of image data output from one image processing IC into a format of image data that is dealt with by the other image processing IC, and outputs the result of conversion to the other image processing IC.

14 Claims, 4 Drawing Sheets

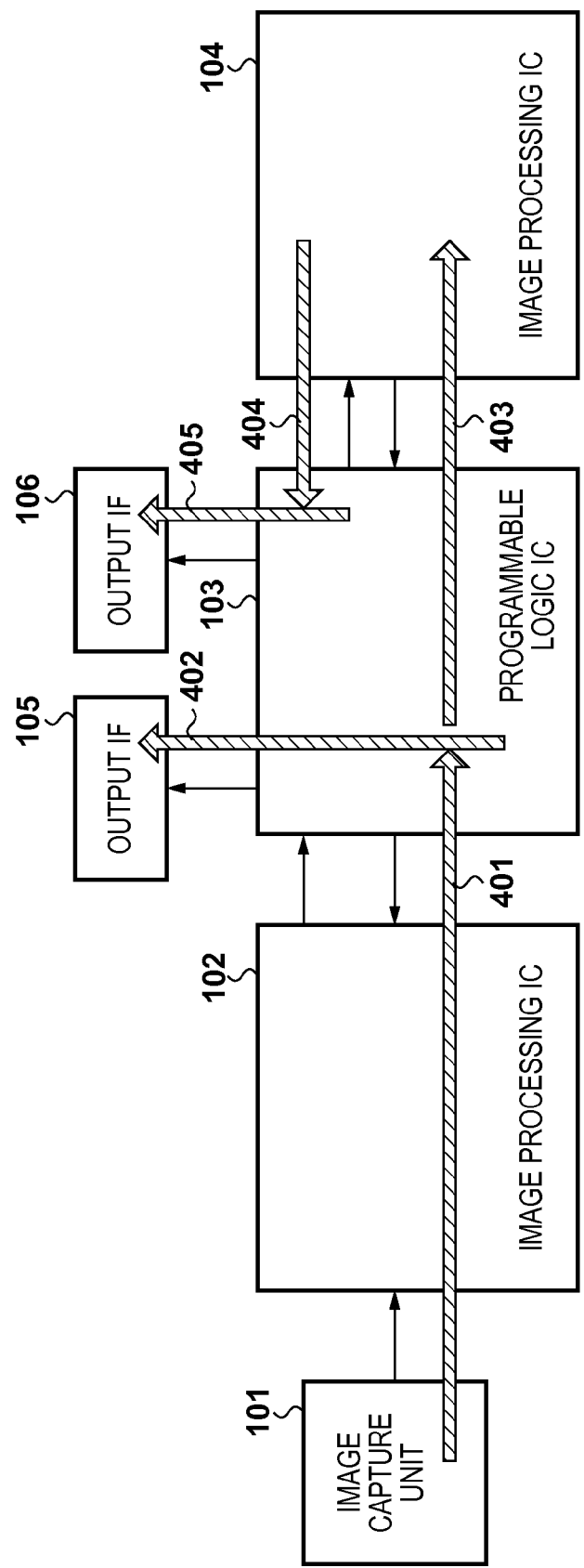

IMAGE PROCESSING APPARATUS AND IMAGE CAPTURE APPARATUS USING A PLURALITY OF INTEGRATED CIRCUITS FOR IMAGE PROCESSING

BACKGROUND OF THE INVENTION

Field of the Invention

The present invention relates to an image processing apparatus and an image capture apparatus.

Description of the Related Art

In recent years, attention is being directed towards a programmable integrated circuit whose internal circuit configurations (wiring) can be changed from outside, one typical example being an FPGA (field-programmable gate array) (Japanese Patent Laid-Open No. 11-40739). As the functions of such a programmable integrated circuit can be changed by rewriting the circuit configurations as necessary, there is a diverse range of possible applications when taking into account the changes in the functions according to operation modes, future function enhancement, etc.

In addition, an image capture apparatus, such as a video camera, commonly includes an integrated circuit (IC) for image processing; in recent years, an image capture apparatus has emerged that uses a plurality of image processing ICs to execute processing at a higher speed, and to process large-volume image data.

In the case where a plurality of ICs are used, direct connection therebetween is not easy, as it requires the communication specifications and the electrical specifications of physical interfaces to match. In particular, an ASIC (application-specific integrated circuit), which is designed to enable all of the functions necessary for a certain application by itself, is commonly not expected to be connected to other ASICs; therefore, connection between ASICs is even more complicated.

SUMMARY OF THE INVENTION

The present invention solves the above problems, and provides an image processing apparatus and an image capture apparatus that can efficiently use a plurality of integrated circuits for image processing.

According to an aspect of the present invention, there is provided an image processing apparatus, comprising: a first integrated circuit (IC) for executing image processing with respect to image data in a first format; a second integrated circuit (IC) for executing image processing with respect to image data in a second format that is different from the first format; a third integrated circuit (IC) connected to the first IC and the second IC; and an output unit that outputs image data in the first format and image data in the second format to an external device, wherein: the first IC outputs the image data in the first format to the third IC, and the third IC converts the image data in the first format output from the first IC into the image data in the second format and outputs the image data in the second format to the second IC, the second IC performs image processing on the image data in the second format received from the third IC and outputs to the third IC the image data in the second format on which image processing is performed, and the third IC provides, to the output unit, the image data in the first format output from the first IC, and the image data in the second format that the third IC has received from the second IC.

According to another aspect of the present invention, there is provided an image capture apparatus, comprising: the image processing apparatus according to the present invention; and an image sensor that outputs the image data in the first format to the first IC.

Further features of the present invention will become apparent from the following description of exemplary embodiments with reference to the attached drawings.

BRIEF DESCRIPTION OF THE DRAWINGS

FIG. 3 shows the flow of video data in the image capture apparatus according to an embodiment.

DESCRIPTION OF THE EMBODIMENTS

Exemplary embodiments of the present invention will now be described in detail in accordance with the accompanying drawings.

First Embodiment

Figure 1:
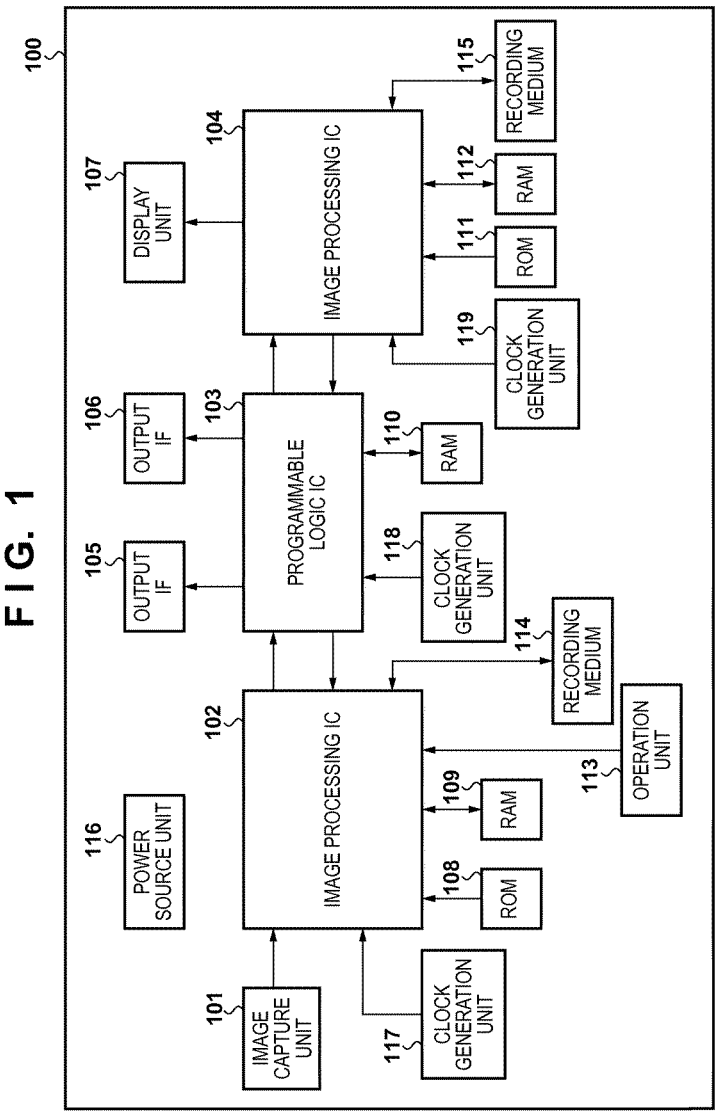
FIG. 1 is a block diagram showing an example of a functional configuration of an image capture apparatus serving as an image processing apparatus according to an embodiment.

FIG. 1 shows a configuration of an image capture apparatus 100 serving as an example of an image processing apparatus according to an embodiment of the present invention. The image capture apparatus 100 of FIG. 1 is configured such that two integrated circuits for image processing (image processing ICs) 102, 104 are connected via an integrated circuit IC (PLIC) 103 with programmable circuit configurations. It should be noted that, while the image processing ICs 102, 104 each have a CPU, they have fixed circuit configurations and are not programmable logic ICs, as will be described later. Additionally, the image processing ICs 102, 104 are ASICs that are each designed to execute image processing that is different from image processing executed by the other.

In FIG. 1, an image capture unit 101 includes an optical system such as a lens, an image sensor, and a circuit that processes image data from the image sensor. The image capture unit 101 captures images of a subject and outputs moving image data. In the present embodiment, the image capture unit 101 outputs moving image data (1080/60p) in a progressive format (first format) at 60 frames per second (fps), with one screen containing 1920 pixels along the horizontal direction and 1080 pixels in the vertical direction. The image processing IC 102 processes moving image data from the image capture unit 101. It should be noted that the image processing IC 102 has a built-in CPU and also functions as a control unit that controls the components of the image capture apparatus 100 by executing control programs.

Figure 2A:
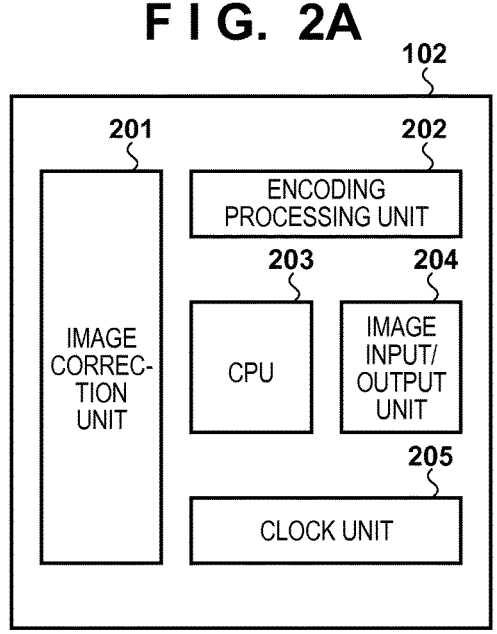
FIGS. 2A to 2C are block diagrams showing examples of functional configurations of image processing ICs and a programmable logic IC.

FIG. 2A shows internal functional blocks of the image processing IC 102 (first integrated circuit). The image processing IC 102 is an ASIC having various types of functions for moving image processing, including a function of processing 1080/60$p$ moving image data. The image processing IC 102 includes a CPU 203, an image correction unit 201, an encoding processing unit 202, an image input/output unit 204, and a clock unit 205. The image processing IC 102 receives a reference clock from a clock generation unit 117 of FIG. 1. The clock unit 205 generates a clock with a frequency for the internal functional blocks by multiplying and/or dividing the received clock, and provides the generated clock to the functional blocks in the image processing IC 102.

As shown in FIG. 1, the image processing IC 102 is connected to both an external ROM 108, which is a non-volatile memory, and an external RAM (DRAM) 109, which is a volatile memory. The CPU 203 reads programs, various types of adjustment parameters, and the like recorded in the ROM 108, deploys them to the RAM 109, and executes them. The CPU 203 can control the functional blocks included in the image processing IC 102 by executing the programs.

The image correction unit 201 executes processing for correcting moving image data input from the image capture unit 101. Examples of this processing include correction of gain characteristics of each pixel in the image sensor, correction of white balance, and correction of a shortage of peripheral illumination caused by a difference between the shape of a circular lens and the shape of a square CMOS sensor. The encoding processing unit 202 executes processing for compressing and decompressing a data amount by executing processing for encoding and decoding moving image data in compliance with H.264 or other encoding schemes. The image processing IC 102 also has a function of recording compressed moving image data into a recording medium 114, and reproducing moving image data from the recording medium 114. In the present embodiment, a random-access recording medium, such as a memory card, is used as the recording medium 114.

The image input/output unit 204 transmits and receives moving image data as digital data to and from the outside of the image processing IC 102. In the present embodiment, the image input/output unit 204 outputs 1080/60p moving image data to the PLIC 103. In addition, 1080/60p moving image data is input to the image input/output unit 204 from the PLIC 103. An operation unit 113 includes a power source switch, a switch for issuing an instruction for starting and stopping the image capture, a mode change switch, and the like. By operating the operation unit 113, a user can issue instructions to and configure settings in the image capture apparatus 100 in association with various operations.

The image processing IC 104 (second integrated circuit) is an ASIC having various types of functions for moving image processing. The image processing IC 104 not only has functions similar to the functions of the image processing IC 102, but also has a function of processing moving image data in an interlaced format (second format) at 60 fields per second (hereinafter, 1080/60i), with one screen containing 1920 pixels along the horizontal direction and 1080 pixels along the vertical direction. A data amount of 1080/60i moving image data is half of a data amount of 1080/60p moving image data per unit time period. For this reason, the image processing IC 104 can be operated with a low-speed clock compared to the image processing IC 102. The image processing IC 104 also has a function of assisting the image capture.

Figure 2C:
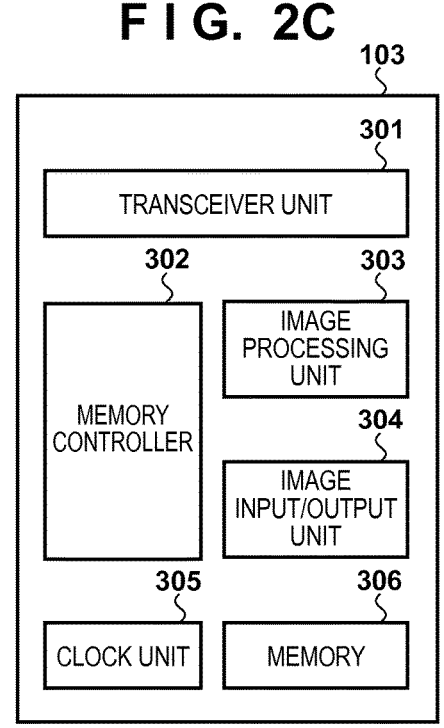
Figure 2B:
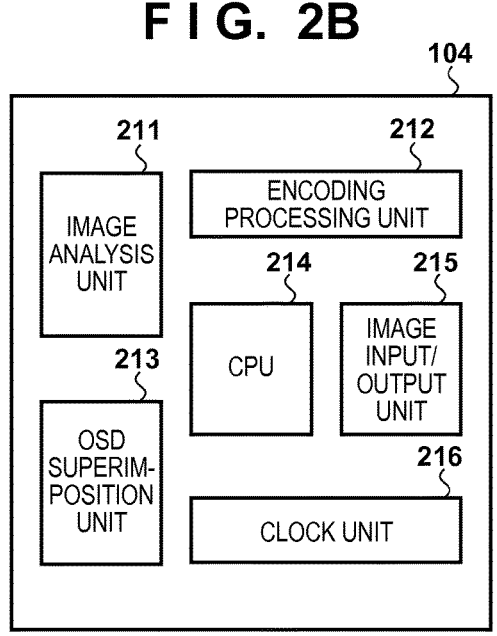

FIG. 2B shows internal functional blocks of the image processing IC 104. The image processing IC 104 includes a CPU 214. The image processing IC 104 also includes an image analysis unit 211, an encoding processing unit 212, an OSD superimposition unit 213, an image input/output unit 215, and a clock unit 216. Similarly to the image processing IC 102, the image processing IC 104 receives a reference clock from a clock generation unit 119. The clock unit 216 generates a clock with a frequency for the internal functional blocks by multiplying and/or dividing the received clock, and provides the generated clock to the functional blocks in the image processing IC 104.

In addition, the image processing IC 104 is connected to both an external ROM 111, which is a non-volatile memory, and an external RAM (DRAM) 112, which is a volatile memory. The CPU 214 reads programs, various types of adjustment parameters, and the like recorded in the ROM 111, deploys them to the RAM 112, and executes them. The CPU 214 controls the functional blocks in the image processing IC 104 by executing the programs. The image analysis unit 211 has a role of analyzing moving image data and extracting information obtained from captured images by, for example, measuring a degree of focus and detecting a movement of the subject. The encoding processing unit 212 executes processing for compressing and decompressing a data amount by executing processing for encoding and decoding moving image data in compliance with H.264 or other encoding schemes. The image processing IC 104 also has a function of recording compressed moving image data into a recording medium 115, and reproducing moving image data from the recording medium 115. In the present embodiment, a random-access recording medium, such as a memory card, is used as the recording medium 115.

The OSD superimposition unit 213 superimposes OSD (on-screen display) information, such as characters and icons, over moving image data. Functions of the OSD superimposition unit 213 include display of, for example, information of various types of modes, a time period that has elapsed, information of a recording time period remaining, and a menu for allowing the user to select various settings. The OSD superimposition unit 213 can also superimpose information for assisting the image capture over moving image data. For example, it has a peaking edge display function of displaying a focused portion in color, a function of displaying color information of the subject in the form of a waveform monitor, etc., on the basis of information obtained from the image analysis unit 211.

The image input/output unit 215 can transmit and receive 1080/60i moving image data as digital data to and from the outside of the image processing IC 104. The image processing IC 104 is connected to a display unit 107 that displays input moving image data, moving image data with OSD information superimposed thereover, and the like. The user can check the operation status of the image capture apparatus 100 from the images displayed on the display unit 107.

The configurations of internal logic circuits of the programmable logic IC (PLIC) 103 (third integrated circuit) can be rewritten (reconfigured) from the outside. In the present embodiment, the PLIC 103 can process both of 1080/60p moving image data and 1080/60i moving image data. FIG. 2C shows internal functional blocks of the PLIC 103. The PLIC 103 includes a transceiver unit 301, a memory controller 302, an image processing unit 303, an image input/output unit 304, and a clock unit 305.

The clock unit 305 generates a clock with a frequency for the internal functional blocks by multiplying and/or dividing a reference clock input from a clock generation unit 118 (FIG. 1), and provides the generated clock to the functional blocks in the PLIC 103. The transceiver unit 301 includes a plurality of interfaces, such as SDIs (serial digital interfaces), for transmitting and receiving data through high-speed serial communication. The transceiver unit 301 is connected to output interfaces (IFs) 105, 106. The output IFs 105, 106 output moving image data to external devices (e.g., a recorder and a display apparatus) connected thereto.

The memory controller 302 controls writing and reading of moving image data to and from the RAM 110. As moving image data has an enormous data amount, a high-speed, large-capacity memory element is used for the RAM 110. In recent years, a DDR3-SDRAM and the like are often used. With use of the RAM 110, the image processing unit 303 changes moving image data into a format suitable for processing in the image processing IC 102 and the image processing IC 104, and regenerates synchronization signals. The image input/output unit 304 transmits and receives moving image data as digital data to and from external devices. For example, as will be described later, 1080/60p moving image data is transmitted to and received from the image processing IC 102. On the other hand, 1080/60i moving image data is transmitted to and received from the image processing IC 104. In order to output moving image data input from the image processing IC 102 to the image processing IC 104, the image processing unit 303 converts the input 1080/60p moving image data into 1080/60i moving image data. On the other hand, in order to output moving image data input from the image processing IC 104 to the image processing IC 102, the image processing unit 303 converts the input 1080/60i moving image data into 1080/60p moving image data.

As such, the PLIC 103 has a function of connecting the image processing IC 102 and the image processing IC 104, which are difficult to connect directly. Furthermore, 1080/60i moving image data is transmitted and received between the PLIC 103 and the image processing IC 102. This makes it possible to set the frequency of an operation clock for transmission and reception of moving image data between the PLIC 103 and the image processing IC 102 to be lower than the frequency of a clock for transmission and reception between the PLIC 103 and the image processing IC 104.

It should be noted that the function of connecting the image processing IC 102 and the image processing IC 104, which are difficult to connect directly, can also be achieved with use of a non-reconfigurable integrated circuit, such as an ASIC. However, in the case where the image processing ICs 102 and 104 are connected using a non-programmable integrated circuit, if it becomes necessary to improve the functions and support new data transfer formats after shipping, the integrated circuit itself needs to be replaced, which is difficult to support. In contrast, in the case where a PLIC with programmable circuit configurations is used, it is sufficient to change the circuit configurations from the outside, which is far easy to support.

Furthermore, a power source unit 116 generates voltage and current required by various devices from a commercial power source, a battery power source, and the like, and provides the generated voltage and current to the components.

A description is now given of the operations of the image capture apparatus 100 at the time of image capture. When the operation unit 113 issues an instruction for turning on a power source, the CPU 203 of the image processing IC 102 starts to provide electric power to the components of the image capture apparatus 100 by controlling the power source unit 116, thereby placing the image capture apparatus 100 into an image capture standby state. In the image capture standby state, the CPU 203 controls the components to display moving image from the image capture unit 101 on the display unit 107.

That is to say, the CPU 203 controls the image capture unit 101 to provide 1080/60p moving image data to the image processing IC 102. After the image correction unit 201 has processed the moving image data from the image capture unit 101, the image processing IC 102 transmits the moving image data to the PLIC 103 without encoding the moving image data with the encoding processing unit 202. It should be noted that the PLIC 103 causes the image processing unit 303 to convert the 1080/60p moving image data from the image processing IC 102 into 1080/60i moving image data, and transmits the converted moving image data to the image processing IC 104.

The image processing IC 104 converts the 1080/60i moving image data received from the PLIC 103 into a format suitable for display on the display unit 107, and displays the converted moving image data on the display unit 107. In addition, at this time, the OSD superimposition unit 213 superimposes various types of icons, information, and the like over the displayed moving image data.

As described above, in the image capture standby state, moving image data obtained by the image capture unit 101 is transmitted from the image processing IC 102 to the image processing IC 104 via the PLIC 103, and displayed on the display unit 107.

In this state, if the operation unit 113 issues an instruction for starting the recording of moving image, the CPU 203 starts the recording of moving image data by controlling the components. In the present embodiment, in a recording standby state, the user can designate one of the recording mediums 114 and 115 as a recording medium serving as a recording destination by operating the operation unit 113. The user can also configure the setting such that moving image data is recorded into both of the recording mediums 114 and 115.

Upon the issuance of the instruction for starting the recording, the CPU 203 identifies which one of the recording mediums 114 and 115 has been designated as a recording destination. If the recording medium 114 has been designated as the recording destination, the CPU 203 encodes the moving image data with the encoding processing unit 202 and records the encoded moving image data into the recording medium 114 while continuously transmitting the unencoded moving image data to the PLIC 103. On the other hand, if the recording medium 115 has been designated as the recording destination, the CPU 203 instructs the CPU 214 of the image processing IC 104 to start the recording of moving image. In response to the instruction for starting the recording from the CPU 203, the CPU 214 encodes the moving image data with the encoding processing unit 212 and records the encoded moving image data into the recording medium 115. In this embodiment, a transmission and a reception of an instruction and a response between the CPU 203 and the CPU 214 are performed through direct communications between the CPU 203 and the CPU 214 over a transmission path therebetween (not shown). However, the PLIC 103 may intermediate the communications between the CPU 203 and the CPU 214.

After the recording of video has thus been started, if the operation unit 113 issues an instruction for stopping the recording, the CPU 203 stops the recording of video into the recording medium 114 or the recording medium 115, which results in the recording standby state.

Furthermore, in the recording standby state, if the operation unit 113 issues an instruction for displaying information for supporting the image capture, the CPU 203 instructs the CPU 214 to display image capture support information. Upon the issuance of the instruction for displaying the image capture support information, the CPU 214 causes the OSD superimposition unit 213 to superimpose, over the moving image data from the PLIC 103, image capture support information corresponding to the result of analysis by the image analysis unit 211. Then, the CPU 214 displays, on the display unit 107, the video with the image capture support information superimposed thereover.

Furthermore, if the operation unit 113 issues an instruction for external output, the CPU 203 performs control to output 1080/60p or 1080/60i moving image data from the transceiver unit 301 of the PLIC 103. Moreover, upon the issuance of an instruction for outputting moving image data over which the image capture support information has been superimposed as on-screen information, the CPU 203 instructs the CPU 214 of the image processing IC 104 to superimpose OSD information. The CPU 203 also instructs the CPU 214 to output, to the PLIC 103, 1080/60i moving image data over which the image capture support information has been superimposed by the OSD superimposition unit 213. Then, the CPU 203 performs control such that the transceiver unit 301 outputs, to the outside, the moving image data from the image processing IC 104 over which the image capture support information has been superimposed.

FIG. 3 shows the flow of moving image data in the above-described processes. Moving image data input from the image capture unit 101 is transmitted to the image processing IC 102. The image processing IC 102 applies correction processing to the moving image data and transmits the moving image data to the PLIC 103 (path 401). The PLIC 103 carries the received moving image data over different paths, that is to say, a path for transmitting the received moving image data to the output IF 105 (path 402), and a path for converting the received moving image data into 1080/60i moving image data and transmitting the converted moving image data to the image processing IC 104 (path 403). Along the path 402, OSD superimposition is not applied to the moving image data input from the image capture unit 101, and the moving image data is transmitted to the transceiver unit 301 of the PLIC 103 in a non-compressed state. Here, the non-compressed moving image data can be recorded by connecting an external recording apparatus to the output IF 105. That is to say, the moving image data processed (output) by the image processing IC 102 is moving image data for recording.

Meanwhile, in order to display captured images on the display unit 107, the PLIC 103 converts the moving image data into 1080/60i moving image data and transmits the converted moving image data to the image processing IC 104 (path 403). That is to say, the image processing IC 104 processes image data for display. The image processing IC 104 causes the OSD superimposition unit 213 to superimpose, for example, necessary image capture information and an RGB waveform monitor or peaking edge display for assisting the image capture, and displays the result of superimposition on the display unit 107. Furthermore, the moving image data with the OSD information superimposed thereover is transmitted to the PLIC 103 again (path 404). The transceiver unit 301 of the PLIC 103 outputs the moving image data with the OSD information superimposed thereover to the outside via the output IF 106. Here, by connecting an external display apparatus to the output IF 106, the video over which assist information for the image capture has been superimposed can be checked on the external display apparatus.

The path 403 is used to check the video that is being captured. Therefore, carrying the moving image data in the interlaced format over the path 403 does not pose any problem in checking the video content on the display unit 107 or the external display apparatus. As described above, a processing load on the image processing IC 104 can be alleviated by the PLIC 103 reducing a data amount of moving image data processed by the image processing IC 104 compared to a data amount of moving image data processed by the image processing IC 102. In addition, the electric power consumed by the image processing IC 104 can be reduced, and the resources of the image processing IC 104 can be allocated to other processing.

Moreover, the PLIC 103 can not only convert video from the progressive format into the interlaced format, but also reduce the screen size of video with the image processing unit 303. Therefore, in the case where the external display apparatus connected to the output IF 105 or 106 has a small screen size, the data amount processed by the image processing IC 104 can be further reduced by reducing the screen size of moving image data along the path 403. In this way, flexible handling is enabled in concert with the purpose of application.

Another advantageous point is that there is freedom of selection with regard to the output IFs 105 and 106; for example, it is possible to make one of them operate in compliance with the 3G-SDI standards, and to make the other operate in compliance with the HD-SDI standards. Additionally, flexible handling can be enabled by presetting the logic configurations of the PLIC 103 such that processing can be executed in accordance with the future transmission standards. Naturally, it is also possible to set the configurations so as to perform operations in compliance with various standards other than the SDI standards, such as the HDMI (registered trademark) and display port standards. Furthermore, the number of interface systems is not limited to two, and may be increased.

It should be noted that, while the image processing IC 104 is configured to process 1080/60i moving image data in the present embodiment, other types of video may also be processed, such as video that has a smaller data amount, e.g., a smaller number of frames and a smaller number of pixels, than video processed by the image processing IC 102. For example, it may be configured to process 1920×1080 video at 30 fps.

As described above, in the present embodiment, a plurality of image processing ICs that are designed for different applications are connected via an integrated circuit that absorbs input/output differences (e.g., data formats and interfaces) between the image processing ICs. Therefore, the functions of the image processing ICs, which are difficult to connect directly, can be used efficiently. Furthermore, in order to achieve a certain group of functions, conventional image processing ICs that can perform a part of the functions can be used in combination without redesigning a new image processing IC; as a result, designing and manufacturing costs can be lowered. Moreover, by connecting the image processing ICs using the programmable logic IC, future function enhancement can be easily supported.

Second Embodiment

A second embodiment will now be described. The second embodiment adopts a configuration in which a difference between the operating frequency of the image processing ICs 102, 104 and the operating frequency of the PLIC 103 is absorbed.

As stated earlier, the independent clock generation units 117 and 119 are connected to the image processing ICs 102 and 104, respectively. In an IC that processes moving image data, an oscillator or an oscillation element that generates a clock having a frequency of 27 MHz is often used as an operation clock. However, clocks output from different oscillators do not have exactly the same frequency depending on the applied voltage, the substrate temperature, percomponent variations, and the like. If moving image data is processed using clocks subjected to frequency drift, the amount of image data processed by each of the image processing ICs 102, 104 per unit time period may be too large or too small.

Figure 4:
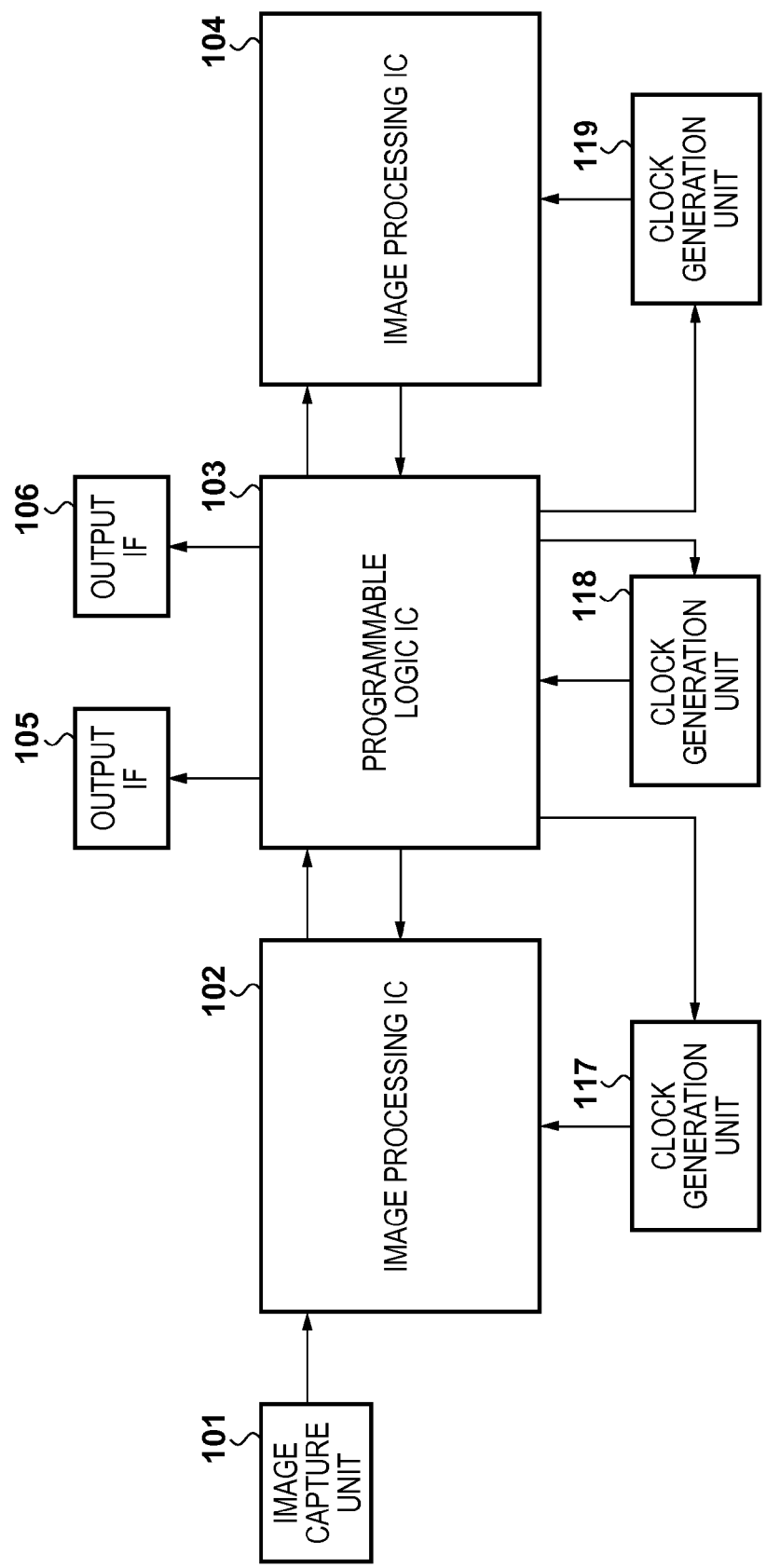
FIG. 4 is a diagram for describing clock control by an image capture apparatus according to a second embodiment.

In view of this, the PLIC 103 controls the clock generation units 117 and 119 (or 118) such that each of the image processing ICs 102, 104 processes the same amount of moving image data per unit time period. VCXOs (voltage-controlled crystal oscillators), which can attain a variable frequency by changing a control voltage, are used as the clock generation units 117, 118, 119. The PLIC 103 controls the clock generation units 117 to 119 as shown in FIG. 4. It is sufficient to generate a modulated pulse using PWM and the like as a control signal, change the modulated pulse into a direct current voltage using a smoothing filter circuit and the like, and provide the direct current voltage as the control voltage to the clock generation units 117 to 119.

In the PLIC 103, moving image data transmitted from the image processing IC 102 is written and temporarily stored into the RAM 110 under control of the memory controller 302. Then, the moving image data is read by controlling an address of the RAM 110, and the read moving image data is output to the output IF 105 and the image processing unit 303. At this time, it is sufficient to perform control to adjust the frequency of the clock generation unit 117 or the clock generation unit 118 such that a difference between the values of the addresses of the RAM 110 for writing and reading equals a predetermined value. Similarly, when moving image data is transmitted from the PLIC 103 to the image processing IC 104, it is sufficient to control the frequency of the clock generation unit 119 such that a difference between the addresses of the RAM 110 for writing and reading equals a predetermined value. In other words, the PLIC 103 controls the frequencies of the operation clocks such that the amount of image data temporarily stored into a buffer region for the image processing ICs 102, 104 equals a predetermined amount.

Furthermore, as long as the clock frequencies of the ICs 102 to 104 are in synchronization with one another, a clock transmitted together with moving image data can be transmitted to the transceiver unit 301 without temporary storage into the RAM 110, especially along the paths 404, 405 of FIG. 3.

Moreover, connection of the independent clock generation unit 118 to the PLIC 103 is beneficial also in relation to the performances of the output IFs 105, 106. Specifically, as an operation clock of the transceiver unit 301 can be provided directly from the clock generation unit 118, the provided clock does not include external noise and has small frequency fluctuations. For example, in the case where SDIs are used as the output IFs, it is necessary to satisfy the standards about jitter performance standardized by the SMPTE, and therefore the foregoing configuration is advantageous.

As described above, in the present embodiment, the programmable logic IC adjusts the frequencies of the operation clocks of the image processing ICs such that the amount of image data processed by each individual image processing IC per unit time period equals a predetermined amount. Therefore, the present embodiment not only achieves the advantages achieved by the first embodiment, but also enables an advantageous reduction of a lag between image data processed by the image processing ICs.

In the above-described embodiments, a programmable logic IC is used as an example of an integrated circuit that connects image processing ICs. However, the advantageous connection and use of image processing ICs dealing with different formats of image data can be enabled without using a programmable logic IC; for example, such advantageous connection and use can be enabled with use of an ASIC that has functions similar to the functions of the above-described programmable logic IC.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073735, filed Mar. 31, 2014, which is hereby incorporated by reference herein in its entirety.

What is claimed is:
1. An image processing apparatus, comprising:
an obtaining unit configured to obtain moving image data in a first format;
a first integrated circuit (IC) connected to the obtaining unit, wherein the first IC executes image processing with respect to the moving image data in the first format output from the obtaining unit;
a second IC that executes image processing with respect to moving image data in a second format that is different from the first format;
a third IC connected to the first IC and the second IC; and
an output unit that outputs the moving image data in the first format and the moving image data in the second format to an external device,
wherein the image processing apparatus has a first mode for outputting the moving image data in the first format by the output unit and a second mode for outputting the moving image data in the second format and corresponding to the obtained moving image data in the first format, wherein in the first mode, the first IC performs image processing on the obtained moving image data in the first format and outputs the moving image data in the first format on which the image processing of the first IC is performed to the third IC, the third IC provides the moving image data in the first format received from the first IC to the output unit without converting the moving image data into the second format, and the output unit outputs the moving image data in the first format provided from the third IC to an external device, wherein in the second mode, the first IC performs image processing on the obtained moving image data in the first format and outputs the moving image data in the first format on which the image processing of the first IC is performed to the third IC, and the third IC converts the moving image data in the first format received from the first IC into moving image data in the second format and outputs the converted moving image data in the second format to the second IC, wherein in the second mode, the second IC performs image processing on the converted moving image data in the second format received from the third IC and outputs to the third IC the converted moving image data in the second format on which the image processing of the second IC is performed, and wherein in the second mode, the third IC provides, the converted moving image data in the second format, on which the image processing of the second IC is performed and received from the second IC, to the output unit, and the output unit outputs the moving image data in the second format provided from the third IC to the external device.

2. The image processing apparatus according to claim 1, wherein the image processing executed by the second IC includes image processing that is not executable in the first IC.

3. The image processing apparatus according to claim 1, wherein the first IC and the second IC each have a function of encoding moving image data and a function of recording the encoded moving image data into a recording medium.

4. The image processing apparatus according to claim 1, wherein the moving image data in the second format has a smaller data amount than the moving image data in the first format.

5. The image processing apparatus according to claim 1, wherein the moving image data in the second format is for display, and the moving image data in the first format is for recording.

6. The image processing apparatus according to claim 5, wherein in the second mode, the second IC superimposes on-screen information on the converted moving image data in the second format received from the third IC and outputs the moving image data in the second format with the on-screen information to the third IC.

7. The image processing apparatus according to claim 1, wherein the third IC has programmable circuit configurations.

8. The image processing apparatus according to claim 1, wherein the third IC controls at least one of operation clocks of the first to third ICs such that the first IC and the second IC each process a predetermined amount of moving image data per unit time period.

9. The image processing apparatus according to claim 1, wherein the moving image data in the first format is moving image data in a progressive format at 60 frames per second with 1920×1080 pixels, and the moving image data in the second format is moving image data in an interlaced format at 60 fields per second with 1920×1080 pixels.

10. The image processing apparatus according to claim 1, further comprising:
a first external random access memory (RAM) connected to the first IC;
a second external RAM connected to the second IC; and
a third external RAM connected to the third IC.

11. The image processing apparatus according to claim 1, wherein the second IC operates under a clock of which a speed is lower than that of a clock under which the first IC operates.

12. The image processing apparatus according to claim 1, further comprising:
a first clock generator connected to the first IC;
a second clock generator connected to the second IC; and
a third clock generator connected to the third IC.

13. The image processing apparatus according to claim 1, wherein the obtaining unit includes an imaging unit, and
wherein in the second mode, the second IC superimposes on-screen information of image capture support information on the converted moving image data in the second format received from the third IC and outputs the moving image data in the second format with the on-screen information to the third IC.

14. The image processing apparatus according to claim 1, wherein:
the image processing apparatus also has a third mode for outputting both the moving image data in the first format and the moving image data in the second format by the outputting unit;
in the third mode, the first IC performs image processing on the obtained moving image data in the first format and outputs the moving image data in the first format on which the image processing of the first IC is performed to the third IC, and the third IC converts the moving image data in the first format received from the first IC into moving image data in the second format and outputs the converted moving image data in the second format to the second IC while providing the moving image data in the first format received from the first IC to the output unit;
in the third mode, the second IC performs image processing on the converted moving image data in the second format received from the third IC and outputs to the third IC the converted moving image data in the second format on which the image processing of the second IC is performed;
in the third mode, the third IC provides the converted moving image data in the second format, on which the image processing of the second IC is performed and received from the second IC, to the output unit while providing the moving image data in the first format received from the first IC to the output unit; and
in the third mode, the output unit outputs the moving image data in the second format while outputting the moving image data in the first format, both of which are provided from the third IC, to the external device.

* * * * *